United States Patent Office 3,124,582
Patented Mar. 10, 1964

3,124,582
PROCESS FOR PRODUCING QUINACRIDONE-
QUINONES
Edward E. Jaffe, Union, N.J., assignor to E. I. du Pont de Nemours and Company, Wilmington, Del., a corporation of Delaware
No Drawing. Filed Mar. 25, 1963, Ser. No. 267,848
9 Claims. (Cl. 260—279)

This invention relates to processes for producing quinacridonequinones, having exceptionally high purity and high intensity as pigments, by cyclizing dialkyl 2,5-diarylaminobenzoquinone-3,6-dicarboxylates, and is more particularly directed to the steps in such a process comprising (1) heating, in an inert, high-boiling liquid at a temperature in the range of 225 to 300° C., a dialkyl 2,5-diarylaminobenzoquinone-3,6-dicarboxylate of the formula:

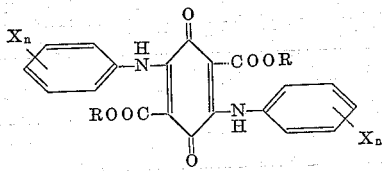

where R is an alkyl group having 1 to 3 carbon atoms, X is not adjacent to an amino group attached to the central ring and is selected from the group consisting of halogen, alkyl having 1 to 3 carbon atoms, alkoxy having 1 to 3 carbon atoms, nitro, and dialkylamino having 1 to 3 carbon atoms in each alkyl, and $n$ is from 0 to 2, whereby a quinacridonequinone is produced having the formula:

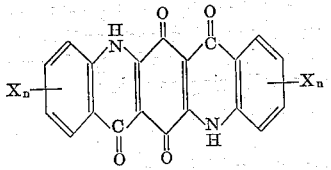

where X and $n$ are the same as in the carboxylate, and (2) separating the resulting quinacridonequinone from the inert liquid.

Quinacridonequinone and its substituted derivatives are known compounds; however, in processes heretofore known for making these compounds the final cyclization takes place from a compound in which the carboxy groups participating in the cyclization are on the pendant aromatic rings. Furthermore, such prior cyclizations require the presence of strongly acid dehydrating agents such as polyphosphoric acid, strong sulfuric acid, and the like.

It is an object of this invention to provide a new method for preparing quinacridonequinone and substituted quinacridonequinones from readily available intermediates. Another object is to prepare such quinacridonequinones in excellent yields and in unusually high purity. A further object is to provide a method for preparing certain substituted quinacridonequinones which cannot readily be prepared by methods heretofore available. Other objects will appear hereinafter.

Now according to the present invention the foregoing and related objects are accomplished by processes in which a dialkyl 2,5-dianilinobenzoquinone-3,6-dicarboxylate or a corresponding compound with suitable anilino ring substitutions, is heated in an inert, high-boiling liquid at 225 to 300° C., whereby cyclization is effected, and the resulting quinacridonequinone is recovered from the inert liquid. The dialkyldicarboxylate used in the reaction is advantageously prepared by halogenating a dialkyl succinylsuccinate to form 2,5-dihalo-3,6-dicarbalkoxybenzocinylsuccinate to form 2,5-dihalo-3,6-dicarbalkoxybenzoquinone, and effecting reaction of the product with aniline or a suitably substituted aniline to give the desired dialkyldicarboxylate.

It will be seen from the above that the processes of this invention advantageously employ for the final preparation of quinacridonequinone, three steps from readily available raw materials. While the essential novelty resides in the third step, the first two steps cooperate with the third in an unobvious way to give a beneficial end result.

In a specific embodiment of the first step, chlorine gas is introduced to an alcohol solution of diethyl succinylsuccinate which is maintained at a temperature below 60° C. by cooling to absorb the heat of the mildly exothermic chlorination reaction in the formation of 2,5-dichloro-3,6-dicarbethoxybenzoquinone. The suspension is finally cooled and the product is filtered from the alcohol. Although this is a spontaneous chlorination reaction, the yields obtained have been somewhat less than quantitative. However, no purification step appears to be necessary before the second step.

In the second step, a suitable arylamine, such as aniline or an X-substituted aniline is reacted with the dichlorodicarbethoxybenzoquinone to give a diarylaminodicarbethoxybenzoquinone. This reaction is also carried out in alcoholic medium but in the presence of a suitable acid acceptor which may be sodium bicarbonate or pyridine or even an excess of the arylamine. The reaction proceeds readily in relatively high yields, approaching the quantitative. This is a general reaction with arylamines and is not unduly restricted either by the position of the substituent which may be present nor by its character, the reaction proceeding well with relatively inert substituents such as the halogens, alkyl and alkoxy substituents and also with such substituents as the nitro or dimethyl amino groups. The products are obtained in relatively high purity and require no special purification.

In a specific embodiment of the third step, which comprises the inventive part of this process, 2,5-diarylamino-3,6-dicarbethoxybenzoquinone, perhaps more correctly known as diethyl 2,5-diarylaminobenzoquinone-3,6-dicarboxylate, (the reaction product of the second step) which contains no substituent on the arylamino group in either position adjacent to the amino group, is suspended in a relatively large volume of high boiling, inert, organic liquid such as "Dowtherm A" (the eutectic mixture of 76.5% of diphenyl oxide and 23.5% of biphenyl) and the mixture is heated to a temperature in the range of about 240–250° C. for about 2 hours. The starting material goes into solution on the heating but thereafter the yellow quinacridonequinone precipitates out and the reaction appears to be complete within the time specified. The slurry is cooled somewhat, say in the range of 100–150° C., filtered, washed with alcohol and dried to give a substantially quantitative yield of a yellow product which is shown to be quinacridonequinone.

The invention will be better understood by reference to the following examples which illustrate the processes of the invention and their application to a variety of substituted products. The term "parts" refers in all cases to parts by weight unless otherwise specified.

*Example 1*

The starting material of this example is 2,5-dichloro-3,6-dicarbethoxybenzoquinone and is prepared from diethyl succinylsuccinate by the following reaction:

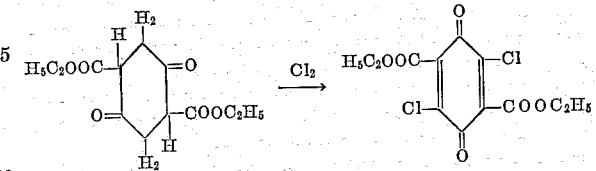

More specifically 200 parts of diethyl succinylsuccinate is suspended and partially dissolved in 800 parts of ethyl alcohol (Formula 2B), in a reactor equipped for cooling, for good agitation and for condensation and return to the vessel of any vapor which results from the reaction. While being thoroughly stirred, chlorine gas (dried by passing through concentrated sulfuric acid) is bubbled in beneath the surface of the solution. A mildly exothermic reaction occurs and the solution is maintained at a maximum temperature of 55–60° C. by external cooling as needed. As the solution warms up, the initial raw material is completely dissolved and soon thereafter a yellow precipitate begins to form. The introduction of chlorine gas is continued for about 5–6 hours, the suspension is cooled, filtered and the solid washed with additional alcohol. After drying, 135 parts of the yellow solid is isolated corresponding to about 54% of the theoretical yield of 2,5-dichloro-3,6-dicarbethoxybenzoquinone. A small sample, recrystallized from methylene chloride, shows a melting point of 197–198° C. Upon analysis, the following figures are obtained:

|   | Calculated for $C_{12}H_{10}O_6Cl_2$, percent | Found, percent |
|---|---|---|
| C | 44.8 | 44.1 |
| H | 3.12 | 2.97 |
| Cl | 22.1 | 22.5 |

This starting material is used in the preparation of 2,5-diarylamino-3,6-dicarbethoxybenzoquinone and is typified by the following reaction as applied to the unsubstituted derivative wherein aniline is condensed with the starting material according to the following reaction:

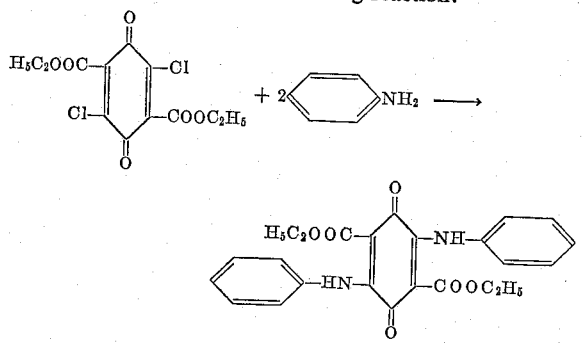

One hundred forty-six parts (0.46 mol.) of 2,5-dichloro-3,6-dicarbethoxybenzoquinone prepared as above described is slurried in 2400 parts of methanol in a suitable container equipped for stirring and for reflux of the vapors from the boiling liquid. 93 parts of aniline (1 mol.) is added to this slurry whereupon the yellow color promptly changes to a brown, indicative of instant reaction. 84 parts (1 mol.) of sodium bicarbonate is added to the slurry as an acid acceptor and the mixture is heated to the boil and refluxed for about 2 hours. It is filtered hot, reslurried in water, refiltered and washed free of soluble salts to give 14 parts of a brownish solid corresponding to a 71% yield of the 2,5-dianilino-3,6-dicarbethoxybenzoquinone (diethyl 2,5-dianilinobenzoquinone-3,6-dicarboxylate).

An improvement upon the above-described process for making the 2,5-dianilino-3,6-dicarbethoxybenzoquinone uses an organic base as the acid acceptor in place of the sodium bicarbonate. 293 parts (0.9 mol.) of 2,5-dichloro-3,6-dicarbethoxybenzoquinone and 186 parts (2 mols.) of aniline are added to 800 parts of methanol containing 20 parts of pyridine. The mixture is heated to the boil and maintained under reflux for about 3½ hours after which it is filtered hot, washed with alcohol and then with water to give 400 parts (100% yield) of 2,5-dianilino-3,6-dicarbethoxybenzoquinone.

In a still more desirable modification of the above-described process for making 2,5-dianilino-3,6-dicarbethoxybenzoquinone, a substantial excess of the arylamine is used as the acid acceptor. 128 parts (0.4 mol.) of 2,5-dichloro-3,6-dicarbethoxybenzoquinone is added to 1600 parts of methanol followed by 149 parts (1.6 mols.) of aniline. The mixture is heated under reflux for about 4 hours, filtered hot and washed with methanol. After drying there is obtained 166 parts (90.6% yield) of a brown solid. A small sample, after recrystallizing from normal butanol, has a melting point of 246–248° C. This sample has the following analysis:

|   | Calculated for $C_{24}H_{22}N_2O_6$, percent | Found, percent |
|---|---|---|
| C | 66.4 | 66.25 |
| H | 5.07 | 4.79 |
| N | 6.57 | 6.46 |

The following table summarizes the results obtained when various substituted arylamines are used to replace the aniline in the above-described methods for preparing 2,5-substituted dianilino-3,6-dicarbethoxybenzoquinones for use in a process of the present invention.

| Item | Arylamine | Wt. for 1.6 mols., pts. | Yield, pts. | M.P., °C. | N analysis, percent Calc. | N analysis, percent Found |
|---|---|---|---|---|---|---|
| 1 | p-chloro-aniline | 204 | 200 | 266–8 | 5.56 | 5.54 |
| 2 | p-anisidine | 195 | 156 | 226–9 | 5.67 | 5.61 |
| 3 | m-chloro-aniline | 204 | 196 | 249–51 | 5.56 | 5.40 |
| 4 | p-fluoro-aniline | 177 | 189 | 246–9 | 5.96 | 6.03 |
| 5 | m-toluidine | 171 | 181 | 223–5 | 6.00 | 6.22 |
| 6 | p-dimethyl-aminoaniline | 217 | 177 | 318–20 | 10.76 | 10.70 |

The product of the above-described process using a substantial excess of aniline as the acid acceptor is converted to quinacridonequinone according to a process of the present invention as follows, the reaction being according to the following equation:

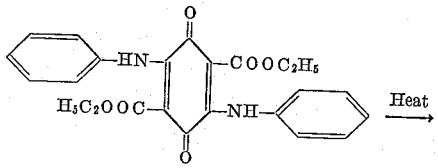

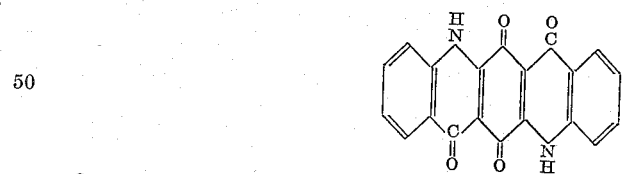

One hundred parts of 2,5-dianilino-3,6-dicarbethoxybenzoquinone is added to 2000 parts of "Dowtherm A" in a vessel equipped for agitation, for external heating and for fractionation of any vapors rising from the liquid. The charge is heated under good agitation to 240° C. and held within the range of 240–245° C. for 2 hours. Upon first heating the raw material goes into solution and shortly thereafter a yellow precipitate begins to come out as it is formed. Upon the completion of the heating period, the charge is cooled to the range of 100–150° C., filtered, washed with alcohol and dried to give 78 parts of a bright yellow quinacridonequinone (100% yield). The infra-red spectrum of this product is identical in every respect with a comparable infra-red spectrum obtained from quinacridonequinone made by the prior art methods.

*Example 2*

This example uses a considerably higher concentration of solid in the pyrolysis liquid and continues the reaction for a longer period than in Example 1 to obtain substantially the same quantitative yield. 166 parts of 2,5-dianilino-3,6-dicarbethoxybenzoquinone is added to 2500 parts of "Dowtherm A" and the charge heated under reflux and agitation for about 3½ hours. Upon cooling, washing with alcohol and drying, 128 parts of essentially equivalent material to that obtained in Example 1 is obtained, corresponding to a 97.8% yield. Without further particle size reduction, this product is a bright yellow pigment showing a much more intense hue than any quinacridonequinone pigment obtained in the prior art.

Example 3

Fifteen parts of 2,5-bis(p-chloroanilino)-3,6-dicarbethoxybenzoquinone is added to 200 parts of "Dowtherm A" and the mixture heated at the boil under reflux for 2½ hours. After cooling to 130° C. it is filtered, washed with methanol and dried to give 12.2 parts (100% yield) of 2,9-dichloroquinacridonequinone. The nitrogen analysis is 6.86% as compared to a calculated analysis of 6.82%. The product is a brilliant yellow pigment somewhat redder than unsubstituted quinacridonequinone. It shows excellent lightfastness in the "Fade-Ometer" after 272 hours.

Example 4

Thirteen parts of 2,5-bis(p-anisidino)-3,6-dicarbethoxybenzoquinone is added to 200 parts of "Dowtherm" which is then heated at the boil under reflux for 2½ hours. After cooling to 130° C. the charge is filtered, washed with methanol and dried to give 10.3 parts (97.3% yield) of 2,9-dimethoxyquinacridonequinone having a nitrogen analysis of 7.09% against the theoretical nitrogen analysis of 6.97%. The product is a yellowish-red which may be described as a maroon in masstone. The lightfastness after 272 hours in the "Fade-Ometer" is excellent.

Example 5

Twenty parts of 2,5-bis(p-fluoroanilino)-3,6-dicarbethoxybenzoquinone is added to 250 parts of "Dowtherm A" and the mixture is heated to the boil and maintained under reflux for about 2 hours. It is then cooled to 130° C., filtered, washed with alcohol and dried to give 16 parts (a quantitative yield) of 2,9-difluoroquinacridonequinone. This product has the following analysis:

|   | Calculated, percent | Found, percent |
|---|---|---|
| N | 7.4 | 7.51 |
| C | 63.55 | 63.33 |
| H | 2.87 | 2.53 |

The product is a brilliant red-shade yellow of excellent lightfastness.

Example 6

Sixteen parts of 2,5-bis(m-chloroanilino)-3,6-dicarbethoxybenzoquinone is added to 200 parts of "Dowtherm A" and the mixture heated under reflux 3.5 hours. It is then cooled to 130° C., filtered and washed with alcohol and then dried to give 12.8 parts (98% yield) of 3,10-dichloroquinacridonequinone having a nitrogen analysis of 6.72% as compared to theoretical nitrogen analysis of 6.82%. This compound is slightly redder than unsubstituted quinacridonequinone but is otherwise a brilliant yellow of excellent lightfastness after 272 hours in the "Fade-Ometer."

Example 7

Twenty parts of 2,5-bis(m-toluidino)-3,6-dicarbethoxybenzoquinone is added to 250 parts of "Dowtherm A" and the mixture heated under reflux for about 2 hours. After filtering, washing and drying as in Example 6, there is obtained 13.8 parts (86.3% yield) of 3,10-dimethylquinacridonequinone having a nitrogen content of 7.51% as compared to theoretical nitrogen content of 7.56%. This product is somewhat less intense than unsubstituted quinacridonequinone but also has excellent lightfastness after 272 hours exposure in the "Fade-Ometer."

Example 8

Five parts of 2,5-bis(p-dimethylaminoanilino)-3,6-dicarbethoxybenzoquinone is added to 100 parts boiling "Dowtherm A" and maintained under reflux for 2 hours. It is cooled, filtered, and washed extensively with alcohol to give 3.3 parts (80.2% yield) of 2,9-bis(dimethylamino) quinacridonequinone having a nitrogen content of 13.27% as compared to theoretical nitrogen content of 13.1%. This product is a dull violet pigment showing only fair lightfastness after 272 hours exposure in the "Fade-Ometer."

Example 9

This example shows the preparation of quinacridonequinone over the general route described in the previous examples but without the isolation of the dianilinodicarbethoxybenzoquinone intermediate.

To 1500 parts of "Dowtherm A" is added 64.2 parts (0.2 mol.) of 2,5-dichloro-3,6-dicarbethoxybenzoquinone followed by the addition of 75 parts (0.8 mols.) of aniline. The charge is heated to about 65° C. and held at that temperature with good agitation for 4 hours. It is then cooled to room temperature and a solution of 30 parts of sodium carbonate (Na$_2$CO$_3$) and 100 parts of water is added slowly and the whole mixture stirred for 15 minutes to convert the aniline hydrochloride, resulting from the use of the aniline as the acid acceptor in the first condensation, to free aniline. The excess aniline is then distilled from the mixture under vacuum, the distillation starting at a column temperature of about 61° C. at a pressure of 3 mm. Hg. Distillation is continued until the aniline content of the distillate is less than about 0.05%, the "Dowtherm" removed with the aniline being replaced in like volume at periodic intervals with fresh "Dowtherm." The neutralization of the aniline hydrochloride results in free sodium chloride (NaCl) in the slurry which is undesirable in the subsequent pyrolysis step. Consequently, it is preferably removed by filtration which must be done at a sufficiently high temperature and with a sufficient amount of "Dowtherm A" present to keep the condensation product of this first step in solution. Conveniently, it is permissible to add approximately 1000 parts of "Dowtherm" to the mixture which is maintained at a temperature of about 130° C. during the filtration step. The filtrate should be kept at a temperature of at least about 120° C. and then added over a 30 minute period to about 1000 parts of boiling "Dowtherm A," the mixture being also maintained under reflux to avoid loss of the solvent. After the addition is complete, the charge is heated under partial reflux for a further period of about 30 minutes and is cooled to about 100° C. at which point it is filtered, washed with methanol and dried to give a theoretrical yield of 65.5 parts of quinacridonequinone of high quality.

In the above examples, the ultimate starting material has been specified as diethylsuccinylsuccinate with the carbethoxy group being maintained in the intermediate steps until the final pyrolysis. It is contemplated that any lower alkyl alcohol may be involved in this esterification so that dimethylsuccinylsuccinate or the dipropyl derivative may be used with equal success. Thus, wherever the carbethoxy group has been specified as present in a compound, it is to be understood that the carbomethoxy or carbopropoxy groups might be present with equal facility.

In like manner, the substituents present on the arylamine may be selected from a broad group of such compounds. Both chlorine and fluorine are shown but it is to be understood that bromine can be used with equal facility. Only the methyl and methoxy groups are shown as hydrocarbon substituents but other alkyl groups or alkoxy groups such as ethyl or propyl or ethoxy or propoxy can be used. Other substituents which can be used on the arylamine include the dimethylamino group shown in Example 1, as well as the nitro group.

With respect to the cyclization reaction of this invention, the position of any substituent on pendent phenyl rings appears to be critical in that satisfactory cyclization has not been obtained in any compound which has a substituent in either of the positions adjacent to the amino group. Thus, the condensation products from o-chloroaniline, o-toluidine and from the naphthylamines have not satisfactorily cyclized to a desired quinacridonequinone. On the other hand, those compounds which have both positions adjacent to the amino group free have cyclized readily regardless of the nature or number of the substituents which may be present elsewhere in the molecule.

The alternative conditions possible under which the dichloro dicarbalkoxybenzoquinone may be formed will not be further discussed since they are conventional and are described in the literature. However, since there is a potential straight-through process without isolation of the intermediate, there is reason to discuss the conditions of condensation with the arylamine.

This condensation requires the presence of an acid acceptor since the complete reaction gives off two mols of HCl for every mol of the dichlorodicarbalkoxybenzoquinone used. This acid acceptor may be an inorganic alkaline salt such as sodium bicarbonate, sodium carbonate or sodium acetate. It may also be an organic base such as pyridine or, equally as satisfactory and for many reasons more desirable, it may be an excess of the aromatic amine which is being condensed, i.e. in excess of 2 mols per mol of the dihalo compound, and preferably at least 4 mols. If the intermediate is isolated, the step of isolation will remove the excess acid acceptor from the mixture. This removal is essential to satisfactory cyclization in the later step. If, on the other hand, the straight-through process without isolation of the intermediate is being followed it is necessary to remove any excess arylamine by any convenient means, such as distillation under vacuum. This removal step is necessary and is accomplished in the same way if the acid acceptor is an organic base such as pyridine which does not participate in the condensation reaction. Before such distillation can be satisfactorily accomplished, it is necessary that the hydrochloride of the aromatic amine or the organic base be neutralized and this may be done by the introduction of an inorganic alkaline material such as sodium carbonate or sodium bicarbonate.

It will be apparent from this discussion that the HCl given off in the initial condensation reaction inevitably ends up as an inorganic salt, usually sodium chloride. This is preferably removed before the cyclization reaction, and removal is conveniently accomplished by adding additional diluent liquid and heating to insure that all of the intermediate is in solution, after which the inorganic salt, which will not be in solution, is removed by filtration.

Critical features of the cyclization reaction are the presence of an inert diluent liquid and use of a sufficiently high temperature to bring about the reaction. The desired temperature is in the range of 225–300° C. with a preferred range of about 240–250° C. It is desirable in order to achieve this temperature range to use a diluent liquid which has a sufficiently high boiling point to enable the reaction to be carried in this temperature range without the use of pressure. Although it could be done with a lower boiling liquid under pressure, this would be economically undesirable. The preferred liquid for this operation is the eutectic mixture of 76.5% diphenyl oxide and 23.5% biphenyl, commercially available under the trade name, "Dowtherm A." However, either of the ingredients of this mixture, either biphenyl or diphenyl oxide could be used alone. Other useful liquids would include the mineral oil fractions boiling in the desired range as well as such liquids as diethyl phthalate, tetramethylenesulfone and the like.

Within the preferred temperature range of 240–250° C., it appears to require about 2 hours to bring about the completion of the cyclization reaction. It is frequently desirable to extend this time to as much as 3 to 3½ hours to insure the completion of the reaction. If the lower part of the temperature range were to be used, it requires somewhat longer reaction time and, conversely, at higher temperatures it would be possible to speed up the reaction somewhat. In general, however, this use of higher temperatures is less convenient in that it limits the choice of diluents or requires pressure and is not looked upon as a preferred procedure.

The isolation of the finished product from the reaction mixture after the cyclization is complete is accomplished by conventional means. The product is insoluble in the liquid and is readily removed by centrifugation or by filtration, followed by removal of the excess liquid by washing with an alcohol. The alcohol can finally be removed by drying, but it can be equally as well removed by further washing with water.

This invention offers two significant advantages. The first is that the products of the invention are of exceptional high purity and appear to be more intense pigments with somewhat better lightfastness than has been obtained by any other method of preparing either quinacridonequinone or its substituted derivatives. The second advantage of the invention is that it permits the preparation of substituted derivatives not heretofore obtainable by convenient synthetic routes.

I claim:

1. In a process for producing a quinacridonequinone the steps comprising (1) heating, in an inert, high-boiling liquid at a temperature in the range of 225 to 300° C., a dialkyl 2,5-diarylaminobenzoquinone-3,6-dicarboxylate of the formula:

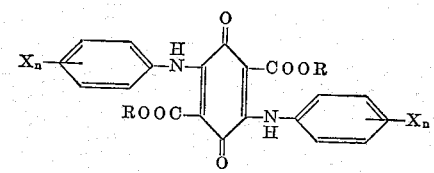

where R is an alkyl group having from 1 to 3 carbon atoms, X is not adjacent to an amino group attached to the central ring and is selected from the group consisting of halogen, alkyl having 1 to 3 carbon atoms, alkoxy having 1 to 3 carbon atoms, nitro, and dialkylamino having 1 to 3 carbon atoms in each alkyl, and $n$ is from 0 to 2, whereby a quinacridonequinone is formed, and (2) separating the resulting quinacridonequinone from the inert liquid.

2. A process of claim 1 wherein the high-boiling liquid is a eutectic mixture of 26.5% biphenyl and 76.5% diphenyl oxide.

3. A process of claim 1 wherein the high-boiling liquid is tetramethylene sulfone.

4. A process of claim 1 wherein the temperature of heating in step (1) is in the range from 245° to 260° C.

5. A process of claim 1 wherein R is methyl.

6. A process of claim 1 wherein R is ethyl.

7. In a process for producing quinacridonequinone the steps comprising (1) heating, in an inert, high-boiling liquid at a temperature in the range of 225 to 300° C., a dialkyl 2,5-dianilinobenzoquinone-3,6-dicarboxylate and (2) separating the resulting quinacridonequinone from the inert liquid.

8. In a process for producing a quinacridonequinone the steps comprising (1) introducing a gaseous halogen into an alcohol solution of a dialkyl succinylsuccinate having 1 to 3 carbons in each alkyl, while maintaining the temperature below 60° C., (2) cooling to precipitate 2,5-dihalo-3,6-dicarbalkoxybenzoquinone formed in (1) and separating it from the alcohol, (3) mixing the recovered product from (2) with an arylamine selected from the group consisting of aniline and substituted anilines of the formula:

where X is not adjacent to the NH₂ and is selected from the group consisting of halogen, alkyl having 1 to 3 carbon atoms, alkoxy having 1 to 3 carbon atoms, nitro, and dialkylamino having 1 to 3 carbon atoms in each alkyl, and $m$ is from 1 to 2, in an alcoholic medium having dispersed therein an acid acceptor, whereby reaction occurs to give a dialkyl 2,5-diarylaminobenzoquinone-3,6-dicarboxylate of the formula:

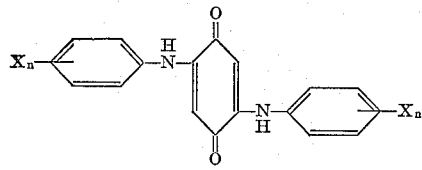

where X is as already defined, R is an alkyl group having 1 to 3 carbon atoms, and $n$ is from 0 to 2, (4) heating said dialkyldicarboxylate in an inert, high-boiling liquid at a temperature in the range of 225 to 300° C., whereby a quinacridonequinone is formed, and (5) separating said quinacridonequinone from the inert liquid.

9. In a process for producing quinacridonequinone the steps comprising (1) mixing aniline and 2,5-dichloro-3,6-dicarbethoxybenzoquinone, in a molar proportion of at least 4:1, at elevated temperature in suspension in an inert liquid boiling at a temperature in the range of 225 to 300° C., whereby chemical reaction occurs to form aniline hydrochloride and diethyl 2,5-dianilinobenzoquinone-3,6-dicarboxylate, (2) neutralizing the aniline hydrochloride by adding an aqueous solution of an alkaline inorganic salt, (3) removing water and excess aniline by vacuum distillation, (4) filtering the remaining solution at elevated temperature to remove inorganic salt resulting from the neutralization, (5) cyclizing the diethyl 2,5-dianilinobenzoquinone-3,6-dicarboxylate in the filtrate by heating the filtrate within the range of 245 to 260° C., and (6) separating quinacridonequinone from the filtrate.

No references cited.